J. METZGER.
FEED HOPPER.
APPLICATION FILED MAY 12, 1915.
1,205,557.
Patented Nov. 21, 1916.
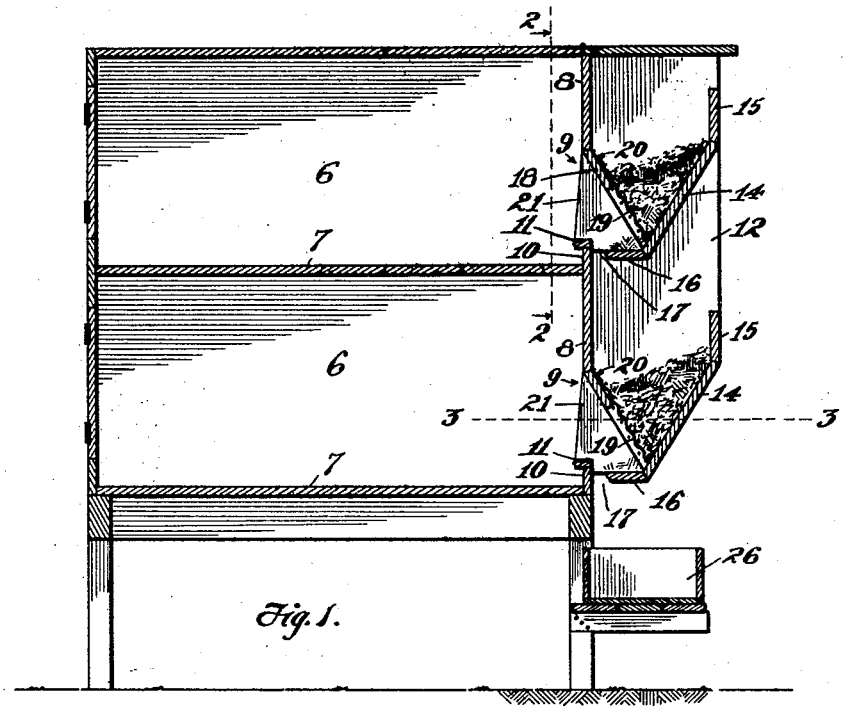
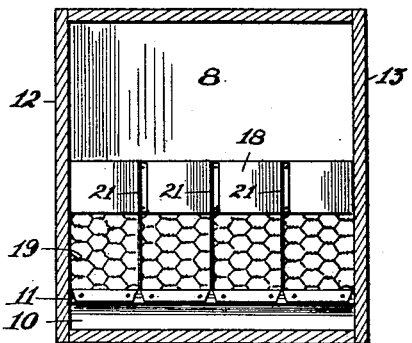
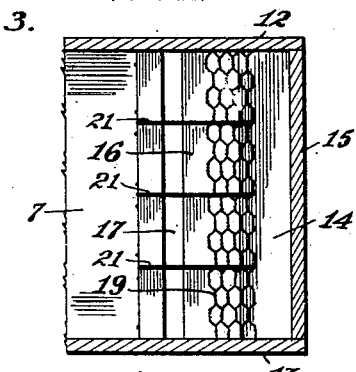
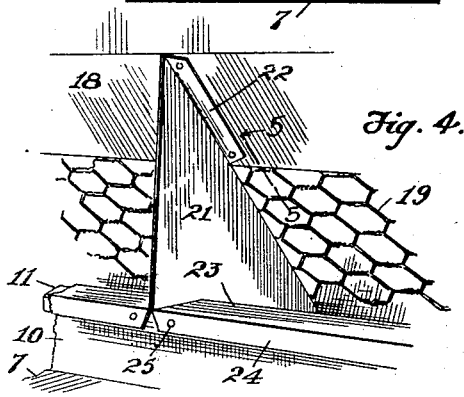
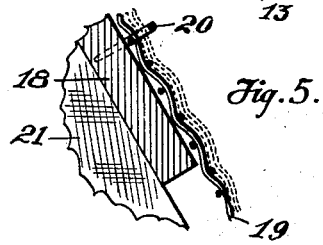
Inventor
John Metzger
By Hazard Perry and Miller
Attys.

UNITED STATES PATENT OFFICE.

JOHN METZGER, OF LOS ANGELES, CALIFORNIA, ASSIGNOR OF ONE-HALF TO OLAF G. NORQUIST, OF HUNTINGTON PARK, LOS ANGELES, CALIFORNIA.

FEED-HOPPER.

1,205,557.   Specification of Letters Patent.   Patented Nov. 21, 1916.

Application filed May 12, 1915. Serial No. 27,508.

*To all whom it may concern:*

Be it known that I, JOHN METZGER, a citizen of the United States, residing at Los Angeles, in the county of Los Angeles and State of California, have invented new and useful Improvements in Feed-Hoppers, of which the following is a specification.

This invention relates to a feed-hopper.

It is the object of this invention to provide a feed-hopper which is especially applicable for use in feeding rabbits and by which a quantity of feed sufficient to supply the rabbits for a considerable period may be so disposed as to be accessible to the animals at all times.

Another object is to provide a feed-hopper which is so constructed and arranged as to prevent unconsumed feed from being scattered on the floor of the hutch and thereby become fouled and wasted.

Another object is to provide a feed-hopper which is adapted to be mounted on superposed hutches so that feed may pass from the upper hopper to the one therebeneath.

Another object is to provide a feed-hopper which will necessitate scratching by the rabbits feeding therefrom so as to give them desirable exercise.

A further object is to provide a feed-hopper of the above character which is simple and economical in construction and which can be readily attached to a rabbit hutch.

Other objects will appear hereinafter.

The invention is illustrated in the accompanying drawings in which:

Figure 1 is a view of a rabbit hutch in vertical section illustrating the invention as applied. Fig. 2 is an enlarged view in section and elevation, as seen on the line 2—2 of Fig. 1 in the direction indicated by the arrows. Fig. 3 is an enlarged horizontal section and plan view as seen on the line 3—3 of Fig. 1 in the direction indicated by the arrows. Fig. 4 is a detail in perspective looking into the feeding portion of the hopper. Fig. 5 is an enlarged detail section on the line 5—5 of Fig. 4.

More specifically, 6 indicates a pair of superposed hutches of any suitable construction, having floors 7 and end walls 8; the latter being formed with rectangular openings 9 arranged a short distance above the floor 7 to provide walls 10 therebeneath, which walls are preferably capped by ledges 11 extending into the hutch above the floor to prevent foul matter from passing through the openings. The present invention resides in the construction of a feed-hopper adapted to be arranged over the openings 9 and attached to the exterior of the end walls 8, as particularly shown in Fig. 1. This hopper comprises vertical parallel side walls 12 and 13 secured to the end walls 8 and inclined rear walls 14 which connect at their upper ends with vertical walls 15 and at their lower ends with horizontal shelves 16. The shelves 16 are disposed on a plane below the lower edges of the openings 9 or top of the ledge 11 and above the floor 7, with their inner edges spaced from the outer face of the walls 8 to form slots or openings 17 which extend throughout the width of the hopper.

Projecting rearwardly from the upper edges of the openings 9 are inclined panels 18 which terminate at their lower edges at a point slightly overlapping the forward edges of the shelves 16 and spaced above the lower edges of the openings 9 and also from the rear walls 14. Secured to the walls 14 are wire screens 19 of large mesh which screens extend upwardly across the spaces between the panels 18 and the walls 14 and are loosely secured at their upper edges to the panels 18 by means of staples 20 or other suitable fastenings, as particularly shown in Fig. 5.

A series of transverse partitions 21 are arranged to extend forwardly from the screens 19 to the openings 9 so as to divide the space in front of the screens into a series of compartments, here shown as four in number. These partitions are preferably formed of sheet metal and have flanges 22 on their upper inclined edges adapted to abut against the under sides of the panels 18 and to be secured to the latter by suitable fastenings. Formed on the lower portions of the partitions 21 are flanges 23 adapted to extend over the upper faces of the ledges 11, as shown in Fig. 4; the flanges 23 having downwardly extending lips 24 on their forward edges which project over and are secured to the inner faces of the ledges by means of nails 25 or other suitable fastenings. These flanges serve to protect the ledges against gnawing.

The screens 19 form a reticulated supporting means for the feed in the hopper and have a mesh of sufficient size to normally retain the feed in the hopper, as shown in Fig. 1, but permit of its being extracted therethrough by the animal feeding from the under side thereof; the loose connection of the upper edges of the screens permitting a slight vibration thereof and a consequent shaking of the smaller portions of the feed therethrough.

The partitions 21 are spaced such distance apart as to permit the animals to at least partly enter the compartments and permit their reaching the screens 19 and portions of the feed deposited on the shelves 16, but are arranged sufficiently close together to prevent the animal from entering the compartment and turning around therein.

In the operation of the invention the feed, which usually comprises a mixture of alfalfa, whole or chopped, and rolled barley or similar substances, is placed in the hopper above the screens 19 in suitable quantities. The animals in feeding reach between the partitions 21 and in scratching on the screens 19 shake the latter so as to keep the feed in the lower portion of the hopper and cause the finer particles to fall through the mesh of the screen on to the shelves 16. An important feature of this invention resides in providing the slots 17 through which unconsumed portions of the feed are discharged, which is effected by natural scratching of rabbits, into the hopper therebeneath or into a receptacle 26 placed beneath the slots 17 in the lowermost hopper for its reception. This arrangement prevents the accumulation of the feed beneath the screen 19 and in conjunction with the walls 10 prevents the feed from being scratched into the hutches and becoming fouled. The unconsumed feed by being delivered to the space beneath the shelf 16, is not wasted, the feed passing from the upper hopper into the one therebeneath and the feed falling into the receptacle 26 being replaced in the hoppers.

While I have shown the invention as applied to a pair of superposed hutches, it is manifest that it may be employed on a single hutch or any number of superposed hutches as occasion may require and that while I have shown the hopper as an integral part of the hutch it may be constructed separately and attached thereto.

Various changes in construction may be resorted to without departing from the spirit and scope of the invention, as set forth in the appended claims.

What I claim is:

1. In a feed-hopper, the combination with a wall having an opening therein, of a feed receptacle having a discharge opening, a wire mesh extending over said feed opening and arranged on an inclination adjacent the opening in the wall, a shelf extending beneath the wire mesh on a plane below the lower marginal edge of the opening in the wall and spaced from said wall to form an unrestricted slot, and a partition extending between the wall and the wire mesh at right angles thereto.

2. In a feed-hopper, the combination with a vertical wall having an opening therein, a rearwardly and downwardly inclined panel at the upper edge of said opening, a feed receptacle into which said panel extends having an inclined wall spaced from said panel to form a discharge opening, a wire mesh extending across said discharge opening secured to said inclined wall and loosely attached at its opposite edge to the inclined panel, and a shelf connecting with the inclined wall beneath the wire mesh on a plane below the lower edge of the first mentioned opening and spaced from the vertical wall to form a slot.

3. In a feed hopper the combination with a vertical wall having an opening therein, of a feed receptacle formed with a discharge opening, a reticulated feed support formed across said discharge opening, a horizontal shelf beneath the reticulated feed support, said horizontal shelf being formed with an unrestricted slot extending longitudinally along its forward edge, and a perpendicular ledge bounding the outer edge of said slot.

4. In a feed hopper the combination of a vertical wall having an opening therein, a feed receptacle formed with a discharge opening, a reticular feed support formed across said discharge opening and arranged at an inclination adjacent the opening in the wall, the lowermost portion of the feed receptacle being on a plane below the lower marginal edge of the opening in the vertical wall, and a horizontal shelf secured to the lower edge of the feed receptacle and toward the vertical wall, and terminating in spaced relation thereto to form a slot.

5. In a feed hopper, the combination with a vertical wall having an opening therein, of a feed receptacle formed with a discharge opening communicating with the opening in the wall, a reticulated feed support formed across said discharge opening, a shelf beneath the reticulated feed support having a slot along its forward edge, a perpendicular ledge bounding the outer edge of the slot terminating above the plane of the shelf, and a horizontal ledge projecting beyond the vertical face of the perpendicular ledge.

In witness that I claim the foregoing I have hereunto subscribed my name this 6th day of May, 1915.

JOHN METZGER.